US012386283B2

(12) United States Patent
Kang et al.

(10) Patent No.: US 12,386,283 B2
(45) Date of Patent: Aug. 12, 2025

(54) APPARATUS AND METHOD FOR FORMING FINE PATTERN

(71) Applicant: RESEARCH & BUSINESS FOUNDATION SUNGKYUNKWAN UNIVERSITY, Suwon-si (KR)

(72) Inventors: DaeJoon Kang, Suwon-si (KR); JaeSeok Hwang, Suwon-si (KR); HyungJe Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 671 days.

(21) Appl. No.: 17/668,599

(22) Filed: Feb. 10, 2022

(65) Prior Publication Data

US 2022/0365459 A1 Nov. 17, 2022

(30) Foreign Application Priority Data

Feb. 10, 2021 (KR) ........................ 10-2021-0019374

(51) Int. Cl.
*G03G 15/02* (2006.01)
*G03G 21/16* (2006.01)

(52) U.S. Cl.
CPC ..... *G03G 15/0216* (2013.01); *G03G 21/1652* (2013.01)

(58) Field of Classification Search
CPC ........................ G03G 15/0216; G03G 21/1652
See application file for complete search history.

(56) References Cited

FOREIGN PATENT DOCUMENTS

| | | | |
|---|---|---|---|
| JP | 2005527974 | * | 9/2005 |
| JP | 2008213327 | * | 9/2009 |

* cited by examiner

*Primary Examiner* — Nathan T Leong
(74) *Attorney, Agent, or Firm* — NSIP Law

(57) ABSTRACT

Disclosed are an apparatus and method for forming a fine pattern. The apparatus for forming the fine pattern includes a lower electrode disposed on a bottom face of a fluid thin-film; an upper electrode positioned above the lower electrode, and spaced apart from the lower electrode by a first spacing, wherein a master pattern is formed on a bottom face of the upper electrode; and a power device configured to apply a high-voltage to between the lower electrode and the upper electrode, thereby generating an electric field therebetween.

6 Claims, 7 Drawing Sheets a b

[FIG. 1]
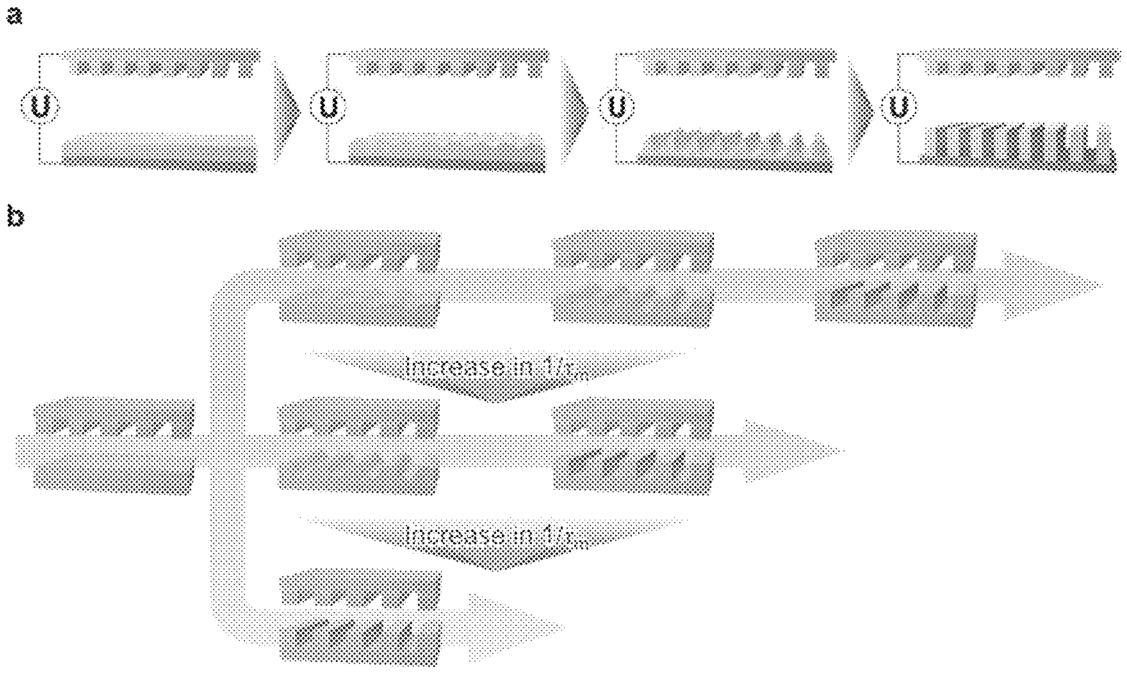

[FIG. 2]
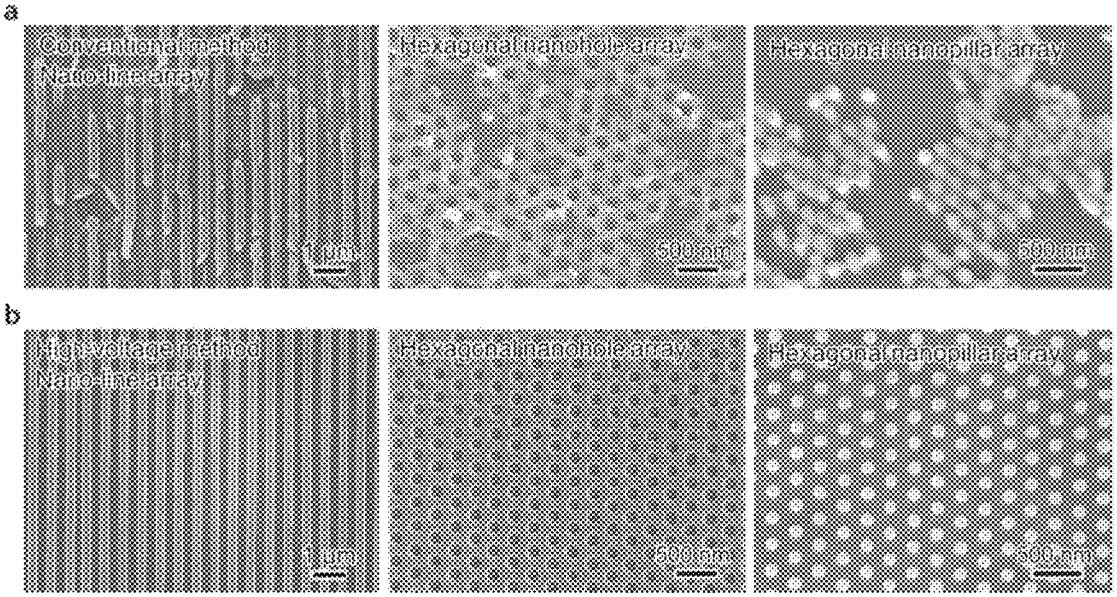
[FIG. 3]
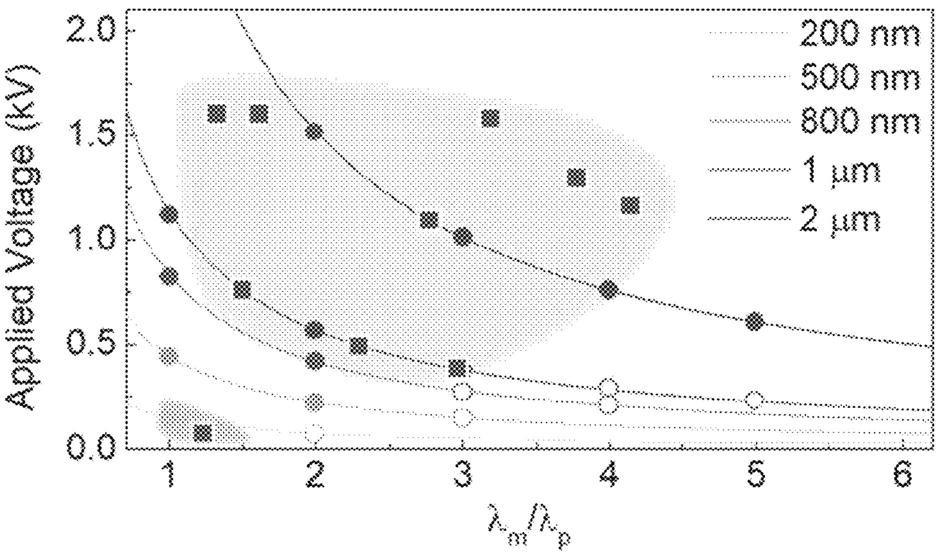

[FIG. 4]
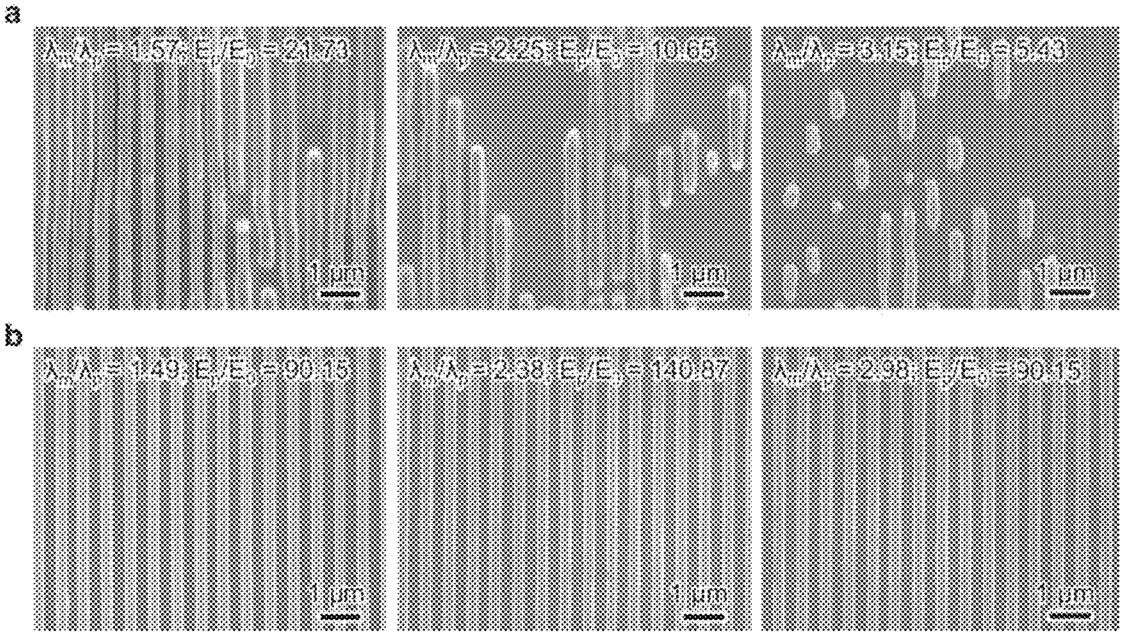
[FIG. 5]
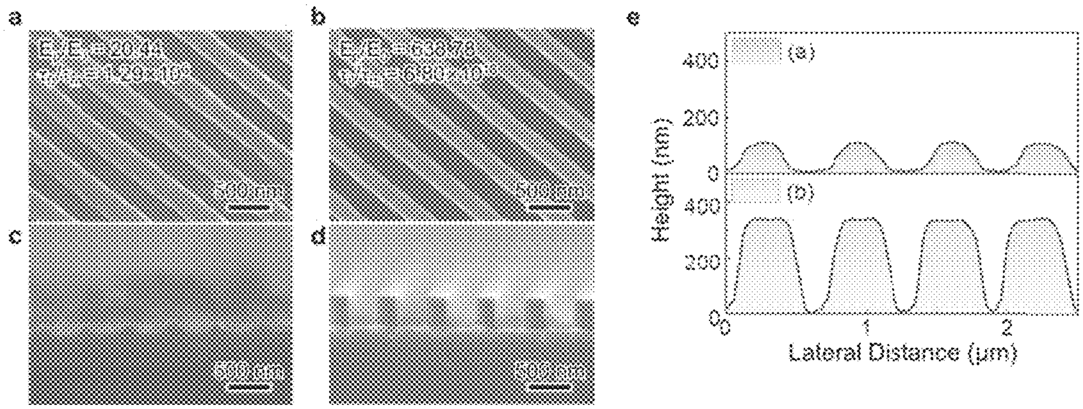

[FIG. 6]
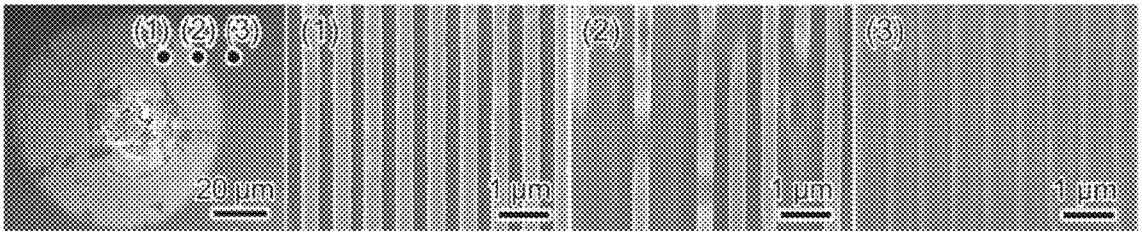
[FIG. 7]
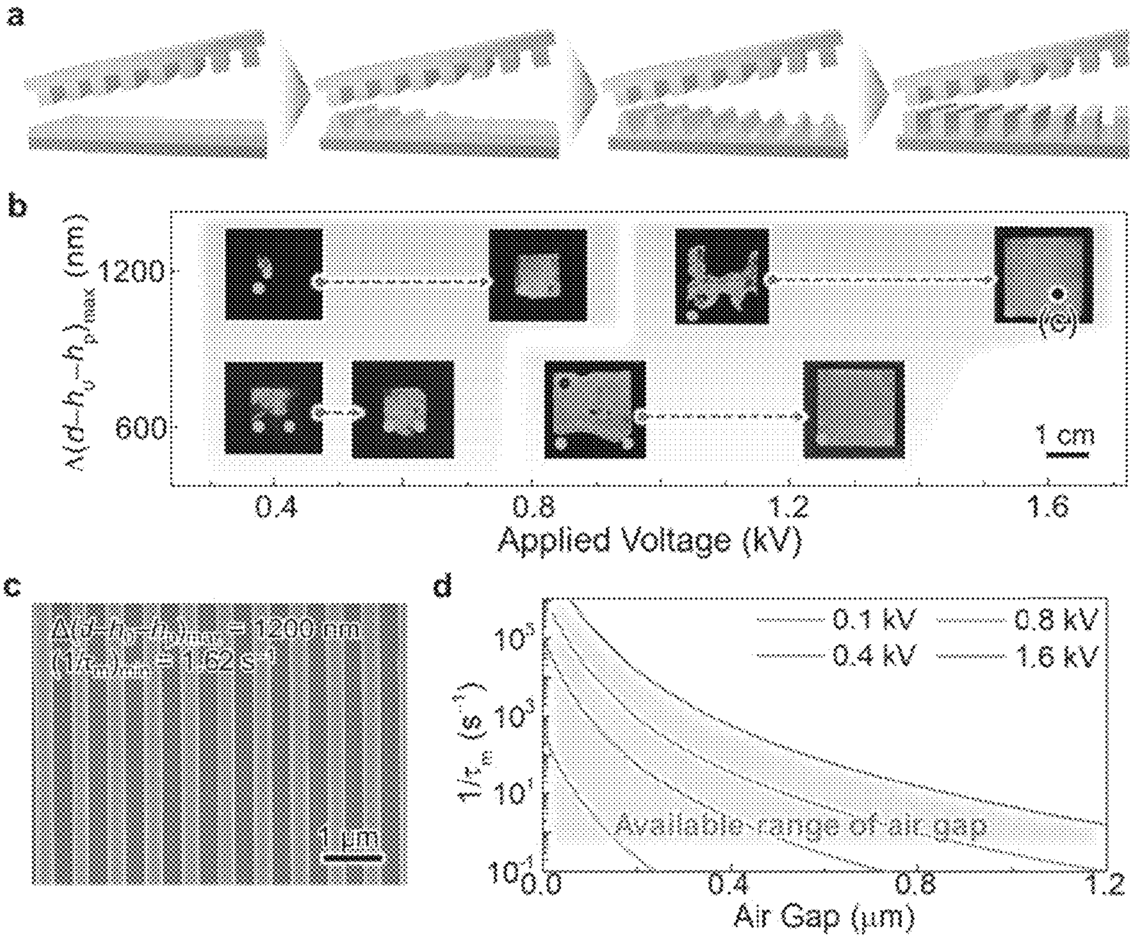

[FIG. 8]
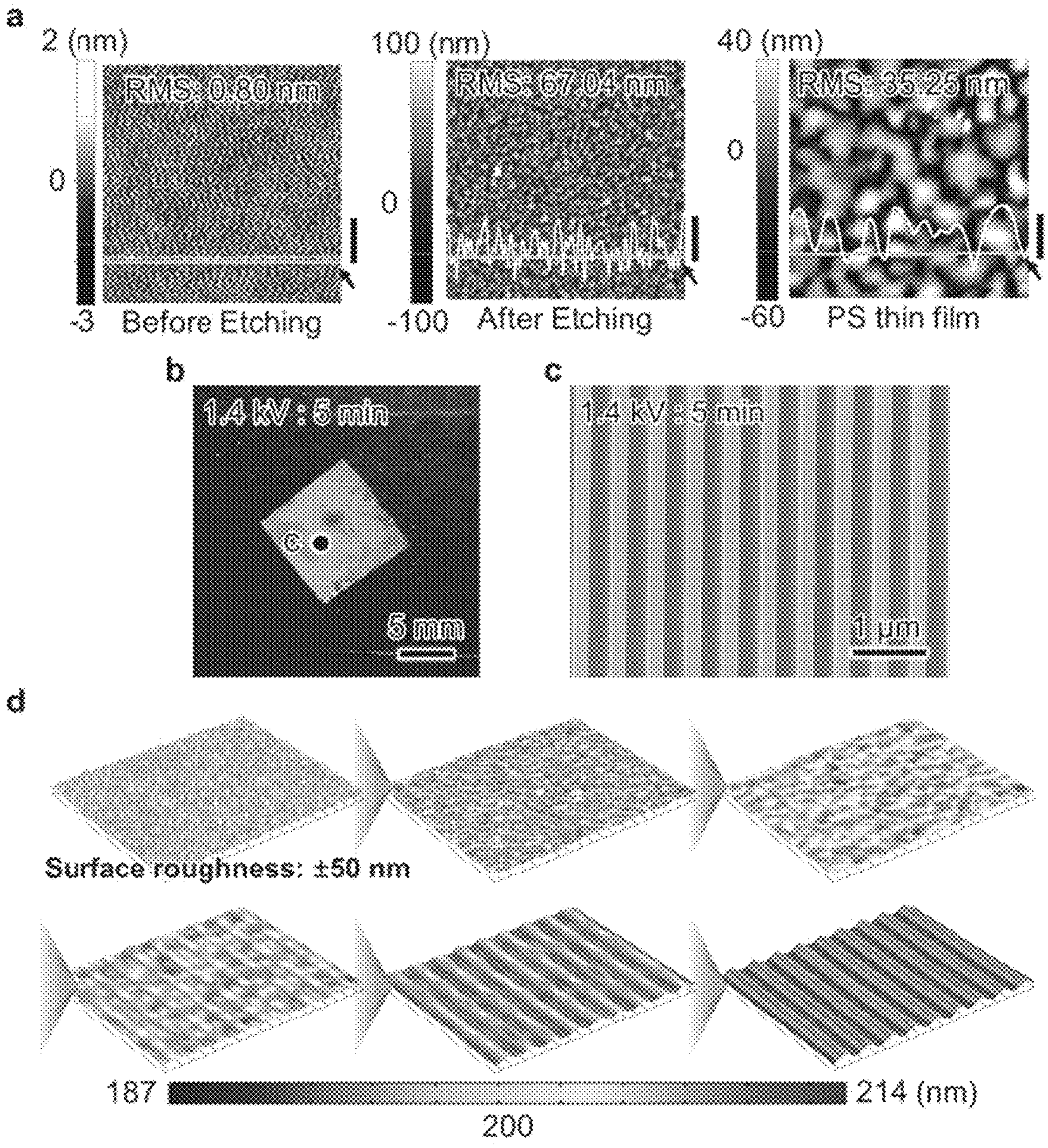

[FIG. 9]
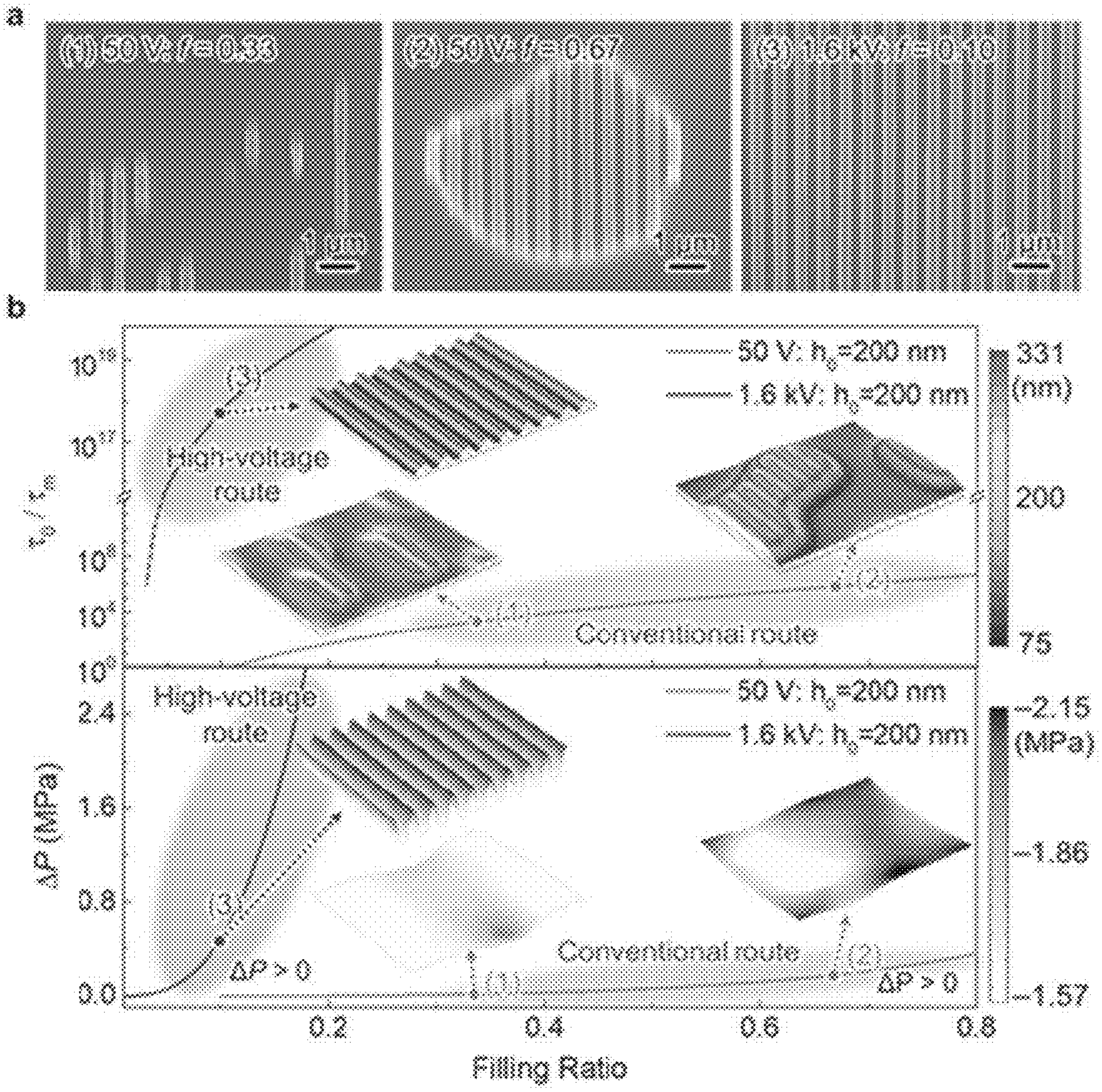

[FIG. 10]
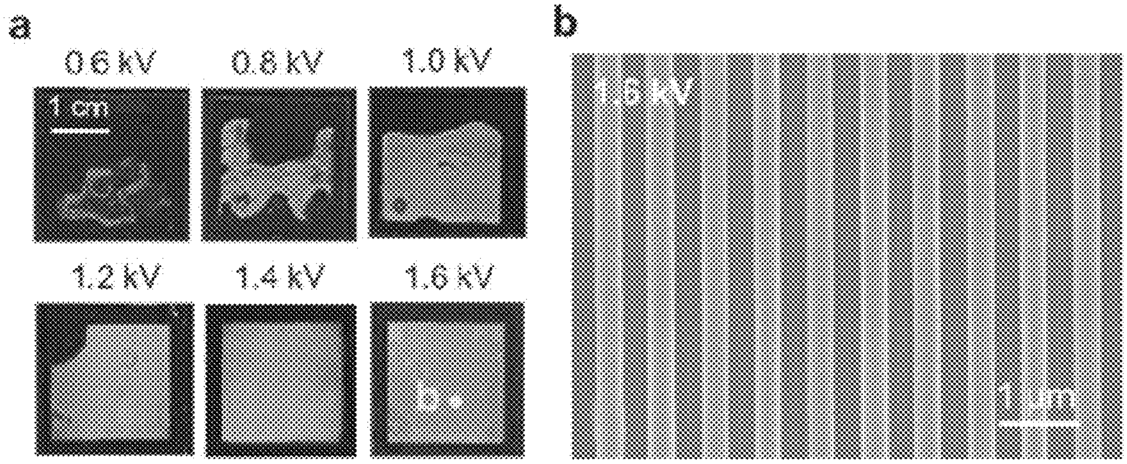

APPARATUS AND METHOD FOR FORMING FINE PATTERN

CROSS REFERENCE TO RELATED APPLICATIONS

This application claims the benefit under 35 USC 119 (a) of Korean Patent Application No. 10-2021-0019374, filed on Feb. 10, 2021, in the Korean Intellectual Property Office, the entire disclosure of which is incorporated herein by reference for all purposes.

TECHNICAL FIELD

The present disclosure relates to an apparatus and method for forming and replicating a fine structure using electrohydrodynamic instability. The present disclosure using a strong electric field, discloses a method that, in contrast to the prior techniques, achieves relaxation of the parameter constraints required in a replication process, thereby enabling formation of a micro/nano-scale pattern with remarkable uniformity and high replica fidelity.

BACKGROUND ART OF THE INVENTION

Various optical and electronic devices based on integrated circuits have maintained high technological achievements and sustained industrial interest as nanotechnology has developed. This trend is intertwined with the development of nanotechnology to study various physical and chemical properties of materials and surfaces at fine levels, eventually culminating in an attempt to develop a technology to maximize the surface area of a material at fine levels.

Lithography is a technology for producing fine patterns by micro/nano fabrication. Photolithography is a representative conventional lithography technology and has been widely used. However, this technology encounters physical limitations such as diffraction of light when fabricating a nano-sized pattern with a resolution below the wavelength of light. On the other hand, electron beam lithography has been used in many fields because it offers higher resolution than photolithography. However, due to the slow and expensive process, it is difficult to meet industrial requirements. Various attempts have been made to overcome these problems of existing lithography technologies. The technological flow has moved towards the development of the so-called ‘next generation lithography’. However, the various lithographies developed to date have inherent technical problems. Typically, nanoimprinting lithography replicates nanostructures with excellent resolution over a large area at relatively low cost. However, contact between a master pattern and a thin-film surface, which is inevitably required in this process, causes residual resist material to be deposited on the master pattern. In addition, air entrapment during the process degrades the quality of the replicas.

Among the various nanofabrication techniques, a method that utilizes the electrohydrodynamic instability of a thin film surface has remarkable technological advantages. This technique utilizes the instability induced in the fluidic thin film surface to which a strong electric field (>10 V/m) is applied to achieve structure formation. The total free energy, which is excessively increased by the electric field, is lowered by the work for the deformation of the thin film surface in the system. At this time, the deformation of the thin film surface can be controlled in different ways based on the spatial distribution of the electric field intensity. When a standardized fine pattern is used as the top electrode, the spatial distribution of the electric field intensity follows the structural characteristics of the fine pattern when the voltage is applied. Since the electrohydrodynamic instability follows the distribution of the electric field strength, the same structure as that of the upper electrode is replicated on the surface of the thin film. In this context, there is no requirement that the distribution of electric field strength must be limited, but fine patterns of different shapes and sizes can be fabricated by controlling the processing parameters such as voltage, thin film thickness, dielectric constant of thin film and surface tension. Since there is no requirement that a specific material must be used in principle, and a separate process step such as “development” in lithography with a light source is not required, various organic and inorganic materials can be used to produce the fine patterns at low cost. In addition, a distance between the top electrode and the thin film surface maintained for the application of an electric field and the growth of the patterns leads to an advantage such as a non-contact process that avoids the problems due to direct contact that the nanoimprinting technique has.

Nevertheless, the technology that uses electrohydrodynamic instability requires a uniform and continuous application of the electric field in the process. In this case, the distance between the two electrodes forming a capacitor structure is kept very small, i.e., in the range of tens to hundreds of nanometers. However, it is technically difficult to control such a nanoscale distance unless there is a separate expensive device. Therefore, not only is the quality of the replicated pattern compromised by the lack of control of the small spacing, but also a pattern area is localized. Another problem arising from the small spacing at the nanoscale is that a protrusion of the master pattern and the replicated pattern growing vertically come into contact with each other quickly, so it is easy to cause structural damage to the formed pattern. In addition, the master pattern cannot be used repeatedly because of this contact. The nanoscale distance (thickness of an air layer, air gap) also affects the level of applied voltage. Since a phenomenon such as dielectric breakdown of the air layer can occur when a voltage is applied above a certain value, the range of applicable voltage is also limited. In particular, there is the problem that the pattern contact in the capacitor structure often causes a short circuit under the applied voltage. In addition, the thickness of the air layer at the nanoscale and the resulting limited range of the applied voltage can limit the electrostatic pressure leading to the growth of the pattern, and consequently severely limit the vertical dimension (height) (aspect ratio) of the resulting structure. The above problems are widely considered to be an obstacle to the universal application of conventional electrohydrodynamic patterning techniques.

DESCRIPTION

Challenge to Solve

This Summary is to present in simplified form a selection of concepts that will be described below in the detailed description. This Summary is not intended to identify all of the key features or essential characteristics of the claimed subject matter, nor is it intended to be used solely as an aid for determining the scope of the claimed subject matter.

One purpose of the present disclosure is to overcome the limitations of the prior techniques and provide a fine pattern forming apparatus capable of forming and reproducing a uniform fine pattern over a large area.

Another purpose of the present disclosure is to provide a fine pattern formation method that uses a strong electric field to relax the constraint of an effective parameter range that has limited the quality of the replicated pattern in the prior techniques, and is therefore capable of forming and replicating a uniform fine pattern over an entire area with improved replicator fidelity.

Solution to the Problem

A first aspect of the present disclosure provides an apparatus for forming a fine pattern, the apparatus comprising: a lower electrode disposed on a bottom surface of a fluid thin film; an upper electrode positioned above the lower electrode and spaced apart from the lower electrode by a first distance, wherein a master pattern is formed on a bottom surface of the upper electrode; and a power supply device configured to apply a high voltage to between the lower electrode and the upper electrode, thereby generating an electric field therebetween.

In one implementation of the apparatus, the apparatus further comprises: a pattern stage for fixing the upper electrode thereto; a sample stage for fixing the lower electrode thereto; a vacuum pump connected to each of the stamp stage and the sample stage and configured to fix the upper electrode and the lower electrode; and a Z-axis manual stage attached to the specimen stage and configured to control the first spacing.

In one implementation of the apparatus, the high voltage comprises a pulsed DC high voltage (DC).

In one implementation of the apparatus, a pulse of the pulsed DC high voltage (DC) is 100 Hz or less.

In one implementation of the apparatus, the pulsed DC high voltage (DC) is 0.4 kV or higher.

In one implementation of the apparatus, the current flowing between the upper electrode and the lower electrode is in a range of 1 to 10 μA.

In one implementation of the apparatus, the first spacing is 1 μm or larger.

A second aspect of the present disclosure provides a method for forming a fine pattern, the method comprising: Positioning an upper electrode having a master pattern formed on a bottom surface thereof over a lower electrode having a fluid thin film formed on a top surface thereof, such that the upper and lower electrodes are spaced apart by a first spacing; and applying a high voltage between the upper electrode and the lower electrode, thereby generating an electric field therebetween.

In one implementation of the method, the high voltage comprises a pulsed DC high voltage (DC).

In one implementation of the method, a pulse of the pulsed DC high voltage (DC) is 100 Hz or lower.

In one implementation of the method, the pulsed DC high voltage (DC) is 0.4 kV or higher.

In one implementation of the method, the current flowing between the upper and lower electrodes is in a range of 1 to 10 μA.

In one implementation of the method, the first spacing is 1 μm or larger.

In an implementation of the method, when the first spacing is 1 μm, a reciprocal of a characteristic time due to the application of the high voltage is maintained at 10 s-1 or greater.

According to the present disclosure, the spacing between the top electrode and the fluid thin film (dielectric thin film) can be kept in the micrometer range. Thus, the process can be easily controlled. The contact between the master pattern (upper electrode) and the replicated pattern can be prevented even during the repeated pattern formation in advance. This not only maintains the durability of the master pattern, but also improves the quality of the replicated pattern.

Effects of the Invention

The method and apparatus according to the present disclosure may use a stronger electric field compared to that in the prior technique, and thus promote the growth of the electrohydrodynamic structure very quickly. Accordingly, the replicated nanopattern may be formed over the entire thin-film area due to the rapid pattern growth despite the non-uniform spacing between the electrodes in nanoscale. In addition, the high-intensity electric field and the micrometer-scale spacing may greatly relax constraint of the parameters such as the filling ratio which was fatal to the quality of the replicated patterns in prior technique. Thus, the process may be easily performed.

By using a strong electric field, the structure replication effectively promotes the growth of the structure toward the top electrode due to the high electrostatic pressure. This may solve the problem of limited aspect ratio (generally smaller than 1), which was a problem in the prior art. Thus, the ability to replicate patterns with a high aspect ratio can make an innovative contribution to the development of various nanostructure-based application devices, such as antifouling surfaces, optical devices, and energy harvesting and storage devices.

In addition to the effects described above, specific effects are described in accordance with the present disclosure along with the following detailed descriptions for carrying out the disclosure.

BRIEF DESCRIPTION OF DRAWINGS

FIG. 1 is a diagram for illustrating an apparatus and method for forming a fine pattern in accordance with the present disclosure. a in FIG. 1 shows a process in which a master pattern attached to an upper electrode is replicated on a thin-film surface located on a lower electrode over time based on a regular spatial distribution of the electric field. b in FIG. 1 shows a process for uniform replication of the fine pattern over a large area due to the increase in the pattern growth rate even with a non-uniform air layer thickness.

FIG. 2 is a diagram showing a scanning electron microscope image of a fine pattern formed via each of Present Example 1 and Comparative Example 1 of the present disclosure. a in FIG. 2 is a diagram showing a fine pattern formed in accordance with Comparative Example 1, that is, conventional electrohydrodynamic patterning. b in FIG. 2 is a diagram showing a fine pattern formed in accordance with Present Example 1 of the present disclosure. It may be identified that when the method according to the present disclosure is applied using a high voltage and a large spacing, a uniform fine pattern may be replicated without damage thereto.

FIG. 3 is a diagram illustrating the formation of fine patterns based on a change in experimental parameters. It may be identified that in the prior art, a wavelength parameter ($\lambda_m/\lambda_p$) indicating a parameter range in the formation of the fine pattern was limited to about 1.5 or less, while in accordance with the present disclosure, the fine pattern area (pink area) is increased as the applied voltage is increased.

FIG. 4 is a diagram showing a scanning electron microscope image of a fine pattern formed via each of Present Example 2 and Comparative Example 2 of the present disclosure. FIG. 4(*a*) is a diagram showing a fine pattern formed based on Comparative Example 2, while FIG. 4(*b*) is a diagram showing a fine pattern formed according to Present Example 2.

FIG. 5 is a view showing a scanning electron microscope image of the fine pattern formed via each of Present Example 3 and Comparative Example 3 of the present disclosure and a vertical dimension (height) and an aspect ratio of the formed fine pattern. a and c in FIG. 5 are diagrams showing a fine pattern formed based on Comparative Example 3 of the present disclosure, while b and d in FIG. 5 are diagrams showing a fine pattern formed according to Present Example 3 of the present disclosure. It may be identified that when using the method according to the present disclosure, the fidelity of the fine pattern is remarkably improved in the three dimensions.

FIG. 6 is a diagram showing a fine pattern formed in accordance with Comparative Example 4 of the present disclosure. FIG. 6 shows that the fine pattern is locally formed at a small spacing. (1), (2), and (3) of FIG. 6 show non-uniformly replicated nanopatterns due to different growth rates within a narrow area.

FIG. 7 is a view showing the fine pattern formed in accordance with Present Example 4 of the present disclosure. a in FIG. 7 is a drawing showing a process in which a fine pattern is formed uniformly over the entire thin film surface due to the high growth rate by the strong electric field, even in the case of uneven spacing. b in FIG. 7 is a diagram showing the area of a diffraction pattern as a function of the applied voltage. c in FIG. 7 is a scanning electron microscope image of a nano-pattern formed with a voltage of 1.6 kV at non-uniform spacing. d in FIG. 7 shows the growth rate as a function of spacing as a function of applied voltage. A relationship is shown between the increase in growth rate due to the use of high voltage and the acceptable spacing range for the formation of fine patterns.

FIG. 8 is a diagram for illustrating a result of the fine pattern formed in accordance with Present Example 6 of the present disclosure. a in FIG. 8 is a diagram for illustrating a ITO glass substrate having random roughness. b of FIG. 8 is a diagram showing that a fine pattern is formed entirely at an applied voltage of 1.4 kV even at random roughness. c of FIG. 8 is a scanning electron microscope image observed in a corresponding example, and d of FIG. 8 is a result based on computer simulation, showing that a fine pattern is formed due to the high-voltage application even at the random roughness.

FIG. 9 is a diagram for illustrating the result of the fine pattern formed in accordance with Present Example 7 of the present disclosure. a in FIG. 9 is a scanning electron microscope image thereof (1) and (2) are results corresponding to prior technique, and (3) are results based on the present disclosure. The results show that dependence on a filling ratio in the fine pattern formation is lowered in accordance with the present disclosure. b in FIG. 9 is a graph for illustrating changes in the filling ratio versus electrostatic pressure and the filling ratio versus reciprocal of characteristic time due to application of the high-voltage.

FIG. 10 is a diagram showing a fine pattern formed using the method of forming a fine pattern according to Present Example 5 of the present disclosure.

DETAILED DESCRIPTION FOR INVENTION'S IMPLEMENT

For simplicity and clarity, the elements in the drawings are not necessarily drawn to scale. The same reference numbers in different drawings represent the same or similar elements and thus serve a similar function. In addition, descriptions and details of known steps and elements are omitted to simplify the description. Moreover, in the following detailed description of the present disclosure, numerous specific details are set forth to provide a comprehensive understanding of the present disclosure. However, it will be understood that the present disclosure may be practiced without these specific details. In other instances, known methods, processes, components, and circuits have not been described in detail so as not to unnecessarily obscure aspects of the present disclosure.

Examples of various embodiments are illustrated and described further below. It will be appreciated that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further appreciated that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be appreciated that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be appreciated that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be appreciated that when an element or layer is referred to as being "connected to", or "coupled to" another element or layer, it may be directly on, connected to, or coupled to the other element or layer, or one or more intervening elements or layers may be present. In addition, it will also be appreciated that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly appreciated by one of ordinary skill in the art to which this inventive concept belongs. It will be further appreciated that terms, such as those defined in commonly used dictionaries, should be interpreted as having a meaning that is consistent with their meaning in the context of the relevant art and will not be interpreted in an idealized or overly formal sense unless expressly so defined herein.

As used herein, the terms "low-voltage" and "low voltage" refer to an applied voltage range used in a conventional electrohydrodynamic patterning technique, and generally mean a voltage within a voltage range of about 0 to 120 V.

As used herein, the terms "high-voltage" and "high voltage" refer to applied voltage used to induce electrohydrodynamic instability in the fluid thin-film, and refer to a range of the applied voltage to generate an electric field intensity equal to or greater $10^8$ V/m (at least 0.4 kV or greater) while the thin-film surface and the upper electrode are spaced from each other by at least 1 μm.

The technique of forming a fine pattern using the electrohydrodynamic instability refers to a method of forming a fine pattern using the deformation of the surface of the fluid thin-film (or dielectric thin-film) by applying a voltage thereto. When the master pattern as a replication target is used as the upper electrode, the electric field applied between the thin-film and the upper electrode undulates regularly based on a period of the master pattern. The electric field applied to the thin-film surface, that is, the difference in electrostatic pressure is applied at the same period as the period of the master pattern. Based on the period, the fluid of the thin-film moves from a place where the total pressure is high to a place where the total pressure is low, thereby lowering free energy in the system. As a result, a structure with the same shape as that of the master pattern may be replicated on the thin-film surface. In the fine structure fabrication method based on this electrohydrodynamic control, the intensity of the electric field is determined based on the vertical dimension (height) of the master pattern. Thus, pattern replication of a desired shape is made based on regular change of the electric field. In this method, various parameters such as viscosity, dielectric constant, and surface tension of the fluid thin-film (or a mixture of reactants) may be present, and a fine pattern may be formed in a controllable manner based on an appropriate combination of these parameters. This will be described in detail with reference to a following Equation 1.

$$\lambda_m = \frac{2\pi}{U}\sqrt{\frac{\gamma[\varepsilon_p d - (\varepsilon_p - 1)h_0]^3}{\varepsilon_0\varepsilon_p(\varepsilon_p - 1)^2}} \quad \text{(Equation 1)}$$

In the Equation 1, $\lambda_m$ denotes the characteristic wavelength, $\gamma$ denotes the surface tension of the reactant mixture, $\varepsilon_p$ denotes the permittivity of the reactant mixture, $\varepsilon_0$ denotes permittivity in vacuum, U denotes the intensity of the applied voltage, and $h_0$ denotes a thickness of a dielectric film (or a thickness of a fluid thin-film) and d represent a distance between the upper and lower electrodes.

Based on the Equation 1, the characteristic wavelength, that is, $\lambda_m$ is most dominantly determined based on the distance d between the upper and lower electrodes minus the thickness $h_0$ of the fluid thin-film, that is, a spacing $(d-h_0)$ $(\lambda_m \propto (d-h_0)^{1.5})$. Therefore, it may be identified that the fine difference in the spacing significantly changes the characteristic wavelength. The prior art uses a strong electric field (about $10^{6\text{-}7}$ V/m) to induce sufficient instability to deform the fluid thin-film surface. In the prior art, in order to generate the strong electric field, the distance d between the upper and lower electrodes is limited to tens to hundreds of nanometers, and a low voltage of about 120 V or lower is used. However, it is difficult to control technically this nano-scale small spacing unless a separate expensive equipment is used.

That is, when the fluid thin-film is unevenly applied or fine particles (impurities) are attached to the substrate surface, the spacing between the upper electrode and the entirety of the fluid thin-film becomes non-uniform, and the pattern is locally replicated only in an area in which the spacing is finely small due to the fine particles (impurities), thereby causing formation of an entirely non-uniform pattern.

Therefore, in accordance with the present disclosure, the distance d between the upper and lower electrodes may be increased and at the same time, the intensity U of the voltage as applied may be increased, such that the influence of the spacing $(d-h_0)$ may be reduced. Accordingly, the present disclosure provides a method for forming a fine pattern in which the strong intensity of the electric field is used and thus which is capable of replicating the same scale fine pattern as the scale of the pattern obtained by the existing method while solving the problem of the prior art.

FIG. 1 is a diagram for illustrating an apparatus and method for forming a fine pattern in accordance with an embodiment of the present disclosure.

Referring to FIG. 1, the apparatus for forming the fine pattern according to the present disclosure may include a lower electrode for supporting a fluid thin-film, an upper electrode located above the lower electrode, and spaced apart from the fluid thin-film by a first spacing, wherein a master pattern is formed on the upper electrode, and a power device for applying a pulsed direct-current (DC) high-voltage between the lower electrode and the upper electrode to generate an electric field.

The upper electrode and the lower electrode are not particularly limited as long as the upper and lower patterns may support the master pattern and the fluid thin-film, respectively. For example, the substrate may be embodied as a glass substrate coated with silicon and ITO. Further, since a high voltage is used in accordance with the present disclosure, the substrate may be made of a highly insulating material. For example, a glass or plastic substrate may be used as the substrate.

The fluid thin-film may have a viscosity sufficient to have constant fluidity. The material constituting the fluid thin-film is not particularly limited as long as it has a viscosity sufficient to have fluidity. For example, the fluid thin-film may be made of a composition in which an organic or inorganic material is dissolved or dispersed in a solvent. The fluid thin-film may be formed by coating the composition on the lower electrode to form the fluid thin-film. The coating scheme may include spray coating, inkjet, drop casting, spin coating and wet coating. Preferably, the fluid thin-film may be formed using wet coating. In the forming the fluid thin-film using the composition including an organic material, after coating the fluid thin-film on the lower electrode, a preheating step of performing heat treatment at a temperature above a glass transition temperature of the organic material may be additionally performed. The pre-heating step may evaporate the solvent of the fluid thin-film coated on the lower electrode, and at the same time, may impart fluidity to the coated fluid thin-film. When an organic material such as polydimethylsiloxane (PDMS) having a glass transition temperature below room temperature or an inorganic material such as metal oxide is used, the pre-heating process is not performed.

A thickness of the fluid thin-film may be in a range of about 50 to 1000 nm. However, the present disclosure does not specifically limit the thickness of the fluid thin-film. A thickness beyond the above range may be available depending on the intensity of the electric field.

As used herein, the master pattern refers to a concave-convex structure and refers to a pattern to be replicated, and may have a size smaller than a spacing between the upper electrode and the fluid thin-film. For example, the master pattern may have a shape such as a cylinder and a liner shape. As for the master pattern, the master pattern may be made of an insulating material, for example, the master pattern may be made of a material including silicon. However, the present disclosure does not specifically limit the shape and the material of the master pattern. The master pattern may be formed via electron beam lithography and etching processes. In order to prevent discharge easily occurring near an edge of the master pattern, a difference between area sizes of the upper electrode and the master pattern may be in a range of about 20% or greater. Further, in order to minimize the risk of arc discharge, it preferable that the upper electrode is located in the center of the fluid thin-film.

The master pattern and the fluid thin-film may be disposed to be spaced apart by the first spacing, and the master pattern and the fluid thin-film may be configured to face each other.

The first spacing means a distance between the upper electrode on which the master pattern is formed and the fluid thin-film, and may be a few micrometer scale spacing that is larger than the nanometer scale spacing in the prior art. For example, the first spacing may be in a range of several to several tens of micrometers. More specifically, the first spacing may be in a range of about 1 to 10 μm. Preferably, the first spacing may be in a range of about 1 to 10 μm. The first spacing may be further larger compared to the above range as the applied voltage increases.

Additionally, the apparatus for forming the fine pattern may further include a pattern stage for fixing the upper electrode, a sample stage for fixing the lower electrode, a vacuum pump connected to each of the stamp stage and the sample stage, and fixing the upper electrode and the lower electrode, and a Z-axis manual stage attached to the sample stage and controlling the first spacing.

The Z-axis manual stage may be configured to move the lower electrode fixed to the sample stage to adjust the first spacing as the distance between the upper electrode and the fluid thin-film. Specifically, when the upper electrode and the lower electrode are spaced from each other and is in a parallel state with each other, the Z-axis manual stage may move the lower electrode in a direction perpendicular to the upper electrode and the lower electrode.

The fine pattern forming method according to the present disclosure may be performed using the fine pattern forming apparatus as described above.

The method for forming the fine pattern according to the present disclosure may include a first step of disposing the upper electrode having the master pattern formed thereon above the lower electrode on which the fluid thin-film is formed such that the upper electrode is spaced from the lower electrode by the first spacing, and a second step of applying a pulsed direct-current (DC) high-voltage between the upper electrode and the lower electrode, thereby generating an electric field.

The pulsed direct-current (DC) high-voltage may have about 100 Hz or smaller. In an alternating current (AC current), + voltage and − voltage are continuously and repeatedly applied. However, the present disclosure is not limited thereto. The pulsed direct-current (DC) high-voltage may refer to a form in which a voltage is periodically applied. For example, when 1 kV pulsed direct-current (DC) high-voltage is applied, 0 V and 1 kV may be continuously and alternately applied periodically. In accordance with the present disclosure, the pulsed direct-current (DC) high-voltage may refer to a form in which a voltage of about 10 to 100 Hz is periodically applied to the electrode.

Further, the pulsed direct-current (DC) high-voltage may be higher compared to that of the prior art. For example, the pulsed direct-current (DC) high-voltage may be a voltage of about 0.4 kV or higher. In one embodiment, the pulsed direct-current (DC) high-voltage may be greater than or equal to about 0.4 kV. Preferably, the pulsed direct-current (DC) high-voltage may be in a range of about 1.0 to 2.5 kV. However, the pulsed direct-current (DC) high-voltage is not necessarily limited thereto, and may be freely controlled to be in a range of about 0.01 kV or higher in consideration of variables such as an area of the master pattern and the material of the fluid thin-film. A current flowing between the upper electrode and the lower electrode may vary based on the applied voltage. In an embodiment, when the pulsed direct-current (DC) high-voltage is in a range of about 1.0 to 2.5 kV, the current flowing between the upper electrode and the lower electrode may be in a range of about 1 to 10 μA, and the first spacing may be in a range of about 1 to 10 μm.

During the second step, a strong electric field of $10^8$ V/m or greater is generated on the fluid thin-film surface due to the applied voltage, and as a result, the electrohydrodynamic instability is induced in the fluid thin-film due to the strong electric field. As the electrohydrodynamic instability increases, the fluid thin-film undulates regularly in a wave manner. This means that after a certain period of time, the wave moves upwardly toward the upper electrode (toward the master pattern, usually upwardly because the master pattern is present on the upper electrode) as the amplitude rises up despite the surface tension acting inside to stabilize the surface. As a result, a fine pattern may be formed on the fluid thin-film.

According to the present disclosure, the problems such as the pattern replication fidelity, short circuit, and limitation of the pattern vertical dimension (height) occurring conventionally may be overcome. The vertical dimension (height)

of the pattern is not limited due to a large micrometer-scale spacing and high voltage application. A cross section of the replicated pattern may have a sharp shape. Further, due to the rapid growth of the electrohydrodynamic structure, the replicated structure may be uniformly formed across the entire thin-film surface despite the nanoscale fine spacing difference. This removes the difficulty in the fine pattern process. The pattern may have a wide range of applications such as various electric devices, optical devices, and harmful substances detection sensors based on the fine pattern.

Hereinafter, an apparatus and a method for forming a fine pattern according to the present disclosure will be described in more detail based on specific Present Examples and Comparative Examples. However, the Examples of the present disclosure are only some embodiments of the present disclosure, and the scope of the present disclosure is not limited to the following Examples.

Present Example 1

The master pattern was manufactured via electron beam lithography and etching process. The manufactured master pattern was manufactured into three types: a line pattern with a line width of 300 nm, and a nano-cylinder/nanohole pattern with a radius of 150 nm and a period of 300 nm. The fluid thin-film was manufactured using polystyrene (PS). A PS mixed solution having a concentration of 2.5 wt % was prepared by mixing 10 mL of toluene as a solvent and 0.257 g of PS as a solvent with each other, heating the mixture at about 60° C., and stirring the mixture at about 800 rpm for 2 hours. Then, a thin-film with a thickness of about 200 nm was formed on the ITO glass substrate for about 30 seconds under 3000 RPM conditions using a spin coater. Thus, the lower electrode on which the PS fluid thin-film was formed was manufactured.

After fixing the upper electrode on which the master pattern was formed and the lower electrode on which the fluid thin-film was formed, respectively, to the pattern stage and the sample stage, the spacing between the upper electrode and the fluid thin-film was adjusted and maintained to and at about 2 μm by adjusting the z-axis stage attached to the sample stage. Then, a voltage of 1.5 kV was applied thereto at 130° C. for 5 minutes without heat treatment to form a fine pattern.

Comparative Example 1

A fine pattern was formed using the same process as that in Present Example 1 of the present disclosure, except that the distance between the upper electrode and the fluid thin-film was maintained at about 300 nm and a voltage of 80 V was applied thereto.

FIG. 2 is a diagram showing a fine pattern formed in accordance with each of Present Example 1 and Comparative Example 1 of the present disclosure.

Referring to a of FIG. 2, it may be identified that when using the conventional fine pattern formation method, the master pattern is removed after the process, and then a replicated pattern of a significant area is attached to the master pattern and comes off. On the other hand, referring to b in FIG. 2, which shows the fine pattern shape method according to the present disclosure using a spacing of 1 μm or larger, it may be identified that a uniform pattern was produced over a large area, and the contact between the replicated pattern and the master pattern was not observed, and as a result, pattern damage did not appear.

This may be because, unlike the prior art, the fine pattern formed in accordance with the present disclosure using the micrometer-scale large spacing dost not contact the master pattern protrusion. The small spacing may allow the growing pattern to easily contact the master pattern. In order to prevent this problem, a technique of depositing a silane-based compound of low surface energy on the master pattern is known. However, this scheme has a problem in that the hydrophobic property of the master pattern disappears due to repeated contact due to repeated use. As shown from the scanning electron microscope measurement result of a in FIG. 2, in the conventional method, there is a problem in that the fine pattern as produced is damaged in the process of detaching the master pattern after the replication process. Further, the failure to control a process time in the pattern replication allows the growth of the pattern even after the pattern comes into contact with the protrusion of the master pattern, resulting in deuteriation of the replication fidelity. These results may be identified in c of FIG. 2. On the other hand, referring to b of FIG. 2, it may be identified that the present disclosure using the large spacing of several micrometers does not encounter this problem when considering the nanoscale vertical dimension (height) of the pattern.

FIG. 3 is a diagram for illustrating the formation of fine patterns based on changes in experimental parameters.

Referring to FIG. 3, a value corresponding to the y-axis in the graph denotes a wavelength parameter, which is obtained by dividing the characteristic wavelength ($\lambda_m$) by the period ($\lambda_p$) of the master pattern. The applied voltage corresponds to the x-axis. It may be identified based on the simulation result that the wavelength parameter corresponding to the voltage may allow an intact pattern replication area to be formed. The expansion of the fine pattern replication area due to the increase of the applied voltage is related to the growth rate of the fine pattern. This will be specifically described with reference to the following Equation 2.

⟨Equation 2⟩

$$\frac{1}{\tau_m} = \frac{h_0^3}{3\eta\gamma} U^4 \left\{ \frac{\varepsilon_0 \varepsilon_p (\varepsilon_p - 1)^2}{(\varepsilon_p (d - h_0 - h_p) + h_0)^3} \right\}^2$$

In the Equation 2, $\tau_m$ denotes a characteristic time constant describing temporal characteristics of unstable thin-film undulation. The reciprocal of the characteristic time constant corresponds to the vertically growing thin-film thickness, that is, the fine structure formation rate. In the above Equation 2, $h_0$, $\eta$, $\gamma$, U, $\varepsilon_0$, $\varepsilon_p$, $h_p$, and d denote an initial thin-film thickness, thin-film viscosity, surface tension, applied voltage, permittivity in vacuum, a dielectric constant of the thin-film material, the vertical dimension (height) of the master pattern and the distance between the electrodes, respectively.

Referring to the Equation 2 and FIG. 3 together, the result due to the increase of the applied voltage may be appreciated as increase in the reciprocal of the characteristic time. In other words, the fine structure growth rate may relieve the constraints of the processing parameters required for the formation of an intact fine structure. Therefore, it may be identified that the fine pattern formation method according to the present disclosure using a high voltage weakens the correlation between the wavelength and the period of the master pattern to ensure easiness of the fine pattern replication. This will be described in more detail in accordance with Present Example 2.

Present Example 2

In accordance with the present disclosure which uses a higher voltage than that in the prior art, pattern formation based on the characteristic wavelength change was identified to identify the easiness of pattern replication. Polystyrene (PS) was used as a material constituting the fluid thin-film. More specifically, a solute of 0.257 g of PS was mixed with 10 mL of toluene as a solvent, and then the mixture was heated at about 60° C., and stirred at about 800 rpm for 2 hours to prepare PS mixed solution of 2.5 wt % concentration. Then, a thin-film with a thickness of about 200 nm was formed on the ITO glass substrate for about 30 seconds under 3000 RPM condition using a spin coater, and then the organic solvent was evaporated via heat treatment at 170° C. and at the same time, fluidity was imparted to the thin film surface, thereby forming the PS fluid thin-film.

The spacing between the upper and lower electrodes was maintained at about 1 μm by adjusting the z-axis stage attached to the sample stage. Each of voltages of 0.4 kV, 0.5 kV, and 0.8 kV was applied to the electrodes for 3 minutes, thereby forming a fine pattern.

Comparative Example 2

A fine pattern was formed in the same process as that in Present Example 3 of the present disclosure, except that the spacing between the upper and lower electrodes was 200 nm and each of voltages of 50 V, 70 V, and 100 V was applied for 3 to 10 minutes.

FIG. 4 is a diagram showing a fine pattern formed in accordance with each of Present Example 2 and Comparative Example 2 of the present disclosure.

Referring to FIG. 4, it may be identified that in the conventional method, as the wavelength parameter changes to 1.57 (100 V), 2.25 (70 V), and 3.15 (50 V), the size and the shape of the formed pattern changes so that it is difficult to observe the formation of the line pattern to be replicated. On the other hand, it may be identified based on the results according to the present disclosure that as the wavelength parameters are changed to 1.49 (0.8 kV), 2.38 (0.5 kV), and 2.98 (0.4 kV), the line pattern of 300 nm line width and 600 nm period is uniformly replicated.

Present Example 3

Polystyrene (PS) was used as a material constituting the fluid thin-film. More specifically, a solute of 0.257 g of PS was mixed with 10 mL of toluene as a solvent, and then the mixture was heated at about 60° C., and stirred at about 800 rpm for 2 hours to prepare PS mixed solution of 2.5 wt % concentration. Then, a thin-film with a thickness of about 150 nm was formed on the ITO glass substrate for about 30 seconds under 3000 RPM condition using a spin coater, and then the organic solvent was evaporated via heat treatment at 120° C. for 20 mins and at the same time, fluidity was imparted to the thin film surface, thereby forming the PS fluid thin-film.

The spacing between the upper and lower electrodes was maintained at about 1 to 2 μm by adjusting the z-axis stage attached to the sample stage. A direct-current (DC) high-voltage pulse of 1.6 kV was applied to the electrodes for 5 minutes to induce a wavelength of about 774 nm onto the thin-film surface to form a fine pattern.

Comparative Example 3

A fine pattern was formed in the same process as that in Present Example 3 of the present disclosure except that a spacing of about 150 nm was maintained using $SiO_2$ of 300 nm thickness deposited on the master pattern, and a voltage of 60 V was applied to induce a wavelength of about 730 nm on the thin-film surface.

FIG. 5 is a diagram showing a fine pattern formed in accordance with each of Present Example 3 and Comparative Example 3 of the present disclosure.

Referring to a and b in FIG. 5, it may be identified that in the conventional method, a fine pattern having almost the same line width as that of the master pattern is formed in a very narrow area. However, it may be identified that in accordance with the present disclosure, a line pattern having a line width of about 250 nm and a period of 600 nm is uniformly formed. Referring to c and d in FIG. 5 indicating the cross section of each of the formed fine patterns, it may be identified that when the fine pattern is formed using the conventional method, the pattern having a curved surface is replicated due to the influence of the surface tension. However, it may be identified that when the fine pattern is formed using the method according to the present disclosure, an edge of the fine pattern is clearly formed in a right angle shape. That is, it may be identified that the replication fidelity of the fine pattern is remarkably improved when the method according to the present disclosure is used rather than the conventional method. Specifically, the result of measuring the pattern vertical dimension (height) using an atomic force microscope is presented in e in FIG. 5. Referring to the graph of e in FIG. 5, it may be identified that the fine pattern formed using the conventional method has a pattern vertical dimension (height) of about 100 nm and an aspect ratio of 0.4, whereas when using the method according to the present disclosure using the direct-current (DC) high-voltage pulses, a vertical dimension (height) of about 330 nm and an aspect ratio of 1.32 of the fine pattern are measured. This indicates that the method and apparatus according to the present disclosure increase the aspect ratio by about 3.3 times compared to that in the prior art. This result may be appreciated as a result of high electrostatic pressure caused by the use of the strong electric field in accordance with the present disclosure. That is, the high electrostatic pressure generated even at a large spacing may minimize the influence of the Laplace pressure as a reaction thereto, and as a result, the aspect ratio may be increased. The prior art using the nanometer scale spacing between both electrode uses the electric field having an intensity below about $10^8$ V/m. When the electric field having an intensity above about $10^8$ V/m is used in the prior art, the insulation destruction may occur. However, the method and apparatus according to the present disclosure using the high-voltage may be expected to successfully apply an electric field of the intensity of $10^8$ V/m or higher even at a spacing of about 1 micrometer or greater.

Comparative Example 4

The master pattern was manufactured using electron beam lithography and etching. In this regard, the manufactured master pattern was manufactured as a line pattern with a line width of 300 nm and a period of 600 nm. In this regard, the master pattern had an area of 1×1 $cm^2$, and $SiO^2$ of 600 nm was left in one of corners. The fluid thin-film was manufactured using polystyrene (PS). A PS mixture solution having a concentration of 2.5 wt % was prepared by mixing 10 mL of toluene as a solvent and a solute of 0.257 g of PS with each other, and then heating the mixture at about 60° C., and stirring the mixture at about 800 rpm for 2 hours. Then, a thin-film with a thickness of about 200 nm was formed on the ITO glass substrate for about 30 seconds under 3000 RPM condition using a spin coater. In this way, the lower electrode on which the PS fluid thin-film was formed was manufactured After fixing the upper electrode on which the master pattern was formed and the lower electrode on which the fluid thin-film was formed, respectively, to the pattern stage and the sample stage, the spacing between the upper electrode and the fluid thin-film was adjusted and maintained to and at a range of about 0 to 1200 nm by adjusting the z-axis stage attached to the sample stage. Then, a voltage of 30 to 120 V was applied to the electrodes for 10 minutes without additional heat treatment to form a fine pattern. The results are shown in FIG. 6.

FIG. 6 is a diagram showing a fine pattern formed using the method of forming a fine pattern of the prior art according to Comparative Example 4 of the present disclosure.

Referring to FIG. 6, it may be identified that the pattern formed using the prior art is formed locally, and at the same time, the short circuit due to contact with the master pattern due to the pattern growth is observed. This non-uniformity in the spacing causes different pattern growth velocities on the surface. Thus, both of intact pattern growth and non-intact pattern growth are found though the same time is used. (1), (2), and (3) in FIG. 6 are experimental results thereof, which show different non-uniform structural properties due to the increase in the spacing

Present Example 4

A fine pattern was formed using the same process as that in Comparative Example 4 of the present disclosure except that a voltage of 0.2 to 1.6 kV was applied. A result of the fine pattern formed using Present Example 4 of the present disclosure is shown in FIG. 7.

FIG. 7 is a view showing a fine pattern formed using the method of forming a fine pattern according to Present Example 4 of the present disclosure.

Referring to FIG. 7, it may be identified that the fine pattern observed in the monochromatic light environment having a wavelength of about 550 nm in b in FIG. 7 has a diffraction pattern due to replication of the line pattern which is the master pattern. It may be identified that as the applied voltage when forming the fine pattern increases, the area expands. In particular, at 0.6 kV or higher, a diffraction pattern of the same area as that of the master pattern (1×1 $cm^2$) is identified. c in FIG. 7 is an image of a nanopattern replicated at 1.6 kV observed with a scanning electron microscope. It may be identified from the image that a pattern having a line width of 300 nm and a period of 600 nm is uniformly replicated over a large area.

The conventional method for forming the pattern is fatal to the non-uniform spacing. However, it may be identified that when using the method for forming the pattern according to the present disclosure, this problem may be solved due to rapid growth such that the uniform pattern may be formed. Further, this result may suggest the possibility of large-area production of the fine patterns using electrohydrodynamic instability. It should be appreciated that although, in the embodiments, only the result of replication of the pattern of up to 2×2 $cm^2$ is shown, the method and apparatus according to the present disclosure may be sufficiently capable of replication of the pattern having a larger area than 2×2 $cm^2$.

Present Example 5

A fine pattern was formed under the same conditions as those in Present Example 5, except that a voltage in a range of 0.6 to 1.6 kV was used and a master pattern having an area of 2×2 $cm^2$ was used. However, in this case, when a voltage of 1.0 kV or higher was used, the master pattern was placed in the center of the substrate as much as possible, and the size of the thin-film surface was larger by at least about 20% that that of the master pattern, in order to prevent arc discharge due to the strong electric field occurring at the edge of the master pattern. The fine pattern formed according to Present Example 5 of the present disclosure is shown in FIG. 10.

FIG. 10 is a diagram showing a fine pattern formed using the method of forming a fine pattern according to Present Example 5 of the present disclosure.

Referring to FIG. 10, it may be identified in a similar manner to that shown in a in FIG. 7 that the area of the formed fine pattern increases as the applied voltage increases. It may be identified from a scanning electron microscope image in b in FIG. 10 that a uniform fine pattern is formed. Thus, it may be identified that the apparatus and method according to the present disclosure may uniformly form the fine pattern even when the area of the master pattern to be replicated increases.

It may be identified based on the results of Comparative Example 5 and Present Example 5 that the conventional method for forming the pattern is fatal to non-uniform spacing, whereas when using the method for forming the pattern according to the present disclosure, this problem may be solved such that a uniform pattern may be formed. Further, this result may suggest the possibility of the large-area production of the fine pattern using electrohydrodynamic instability. It should be appreciated that although, in the embodiments, only the result of replication of the pattern of up to 2×2 $cm^2$ is shown, the method and apparatus according to the present disclosure may be sufficiently capable of replication of the pattern having a larger area than 2×2 $cm^2$.

Present Example 6

In order to prove that even when the fine spacing between the upper electrode and the fluid thin-film is changed randomly, a uniform fine pattern is formed, an ITO glass substrate having a thickness of about 0.1 to 0.6 mm and random roughness was used. The random roughness of the ITO glass substrate was formed using plasma etching. Specifically, after placing the ITO glass substrate inside the chamber, gas of the oxygen partial pressure of 1 sccm and 5 sccm of carbon tetrafluoride were injected thereto, and then etching with plasma was performed for 20 minutes at power of 50 W.

A fine pattern was formed under the same conditions as those in Present Example 4 of the present disclosure, except that an ITO glass substrate with the random roughness was used. The results are shown in FIG. 8.

Referring to a in FIG. 8, the results of the ITO glass substrate with improved surface roughness via the plasma etching may be identified. The surface roughness (rootmean-square: RMS) of the ITO glass substrate increased from approximately 0.80 nm to 67.094 nm. b in FIG. 8 shows the result of this replication, and shows a fine pattern of 1×1 $cm^2$ in a single light environment with a wavelength of about 550 nm. c in FIG. 8 is a scanning electron microscope image of the fabricated replicated nanopattern, and shows the intact replicated line pattern shape. d in FIG. 8 shows a computer simulation result of the fine pattern formation proceeding when the high-voltage is applied after the random roughness is set to a range from −50 to +50 nm. Thus, it may be identified that the master pattern used in the same way as in the embodiment is intactly replicated even at the random roughness.

The problem of the prior art is that a replicated pattern is locally formed due to the uneven spacing at the fine scale, and non-uniformity appear in the thus formed pattern area. This reason may be understood based on the growth of the pattern over time based on the electrohydrodynamic principle. The undulating thin-film causes vertical growth over time, i.e., an increase in a magnitude of the amplitude, which is related to the dynamic flow of fluid over time. In this regard, the change in the vertical dimension of the thin film over time is determined based on the characteristic time. This will be described in detail with reference to the above Equation 2.

Based on the Equation 2 above, the reciprocal $1/\tau_m$ of the characteristic time refers to the change inamplitude over time when the thin-film surface is undulating at the fastest speed. More specifically, the reciprocal $1/\tau_m$ of the characteristic time is equal to the growth rate of the pattern in the vertical direction at an initial state when time is 0. When the change in the spacing $d-h_0$ on a plane is constant, the applied voltage U mainly dominates $\tau_m$.

Therefore, referring to d from FIG. 7 together with equation 2, d from FIG. 7 shows the change of 1/τm in a range from 0 to 1200 nm. It can be seen that 1/τm decreases rapidly with increasing distance at low voltage and then converges to 0. This means that in a realistic situation where the distance is not constant, a pattern is formed only in a region of small distance. On the other hand, $1/\tau_m$τ_m decreases less rapidly with increasing voltage. d in FIG. 7 shows a clear difference between the existing method with low voltage and the method according to the present disclosure. The rapid increase in characteristic time due to the application of direct current (DC) and high voltage pulses reduces the influence of characteristic wavelength on pattern formation. FIG. 3 shows the change in characteristic wavelength as a function of voltage. From FIG. 3, it can be seen that the change in wavelength is greatly reduced by the direct current (DC) high voltage application and, accordingly, the uniformity of the pattern produced can be ensured even when the spacing is uneven. In other words, this indicates not only that the reproduction of a large area of the fine pattern can be achieved even at irregular intervals, but also that the uniformity of the pattern, i.e., good fidelity, can be achieved at the same time.

Present Example 7

As described above, it can be identified that the fidelity of the replicated pattern in the conventional fine pattern generation method is strongly affected by the distance between the top electrode and the liquid thin film. In other words, this may be due to the influence of the filling ratio (hereinafter referred to as f) between the thickness of the liquid thin film and the distance between the top electrode and the liquid thin film. To compare the method according to the present disclosure with the conventional fine pattern generation method, an experiment based on the change of f was conducted. For the change of f in the conventional fine pattern generation method, the thickness of the thin film was adjusted to about 100 to 200 nm using the RPM difference of the spin coater. Initially, in the conventional fine pattern generation method, the distance between the top electrode and the bottom electrode was kept at about 300 nm, and a pressure of about 5 $kgf/ccm^2$ or more was uniformly applied to the master pattern from above the top electrode to keep the distance as uniform as possible. A voltage of about 50 V was applied at this time. For comparison, in the fine pattern method according to one embodiment of the present disclosure, the distance between the upper electrode and the lower electrode was fixed at about 2.2 μm (f=0.1) and a voltage of 1.6 kV was applied to generate a pattern. Except for these conditions, a fine pattern was formed under the same conditions as in the present Example 4 of the present disclosure. The results are shown in FIG. 9.

Referring to FIG. 9, in (1) and (2) of a in FIG. 9, which shows the results of the fine pattern formed by the conventional fine pattern formation method, different patterns were observed when f was changed to about 0.33 to 0.67. At f 0.33 (1), most of the replication line patterns were only partially replicated, and the line patterns were discontinuous. At f value of 0.67 (2), due to the tiny space between the thin film surface and the protrusion of the master pattern, the pattern easily came into contact with the protrusion, and the pattern continued to grow downward to the non-protrusion via the continuous growth. On the other hand, it may be identified that in the fine pattern (3) formed by the fine pattern formation method according to one embodiment of the present disclosure, the line pattern is replicated intact while avoiding the results shown in FIG due to the low f and at the same time avoiding the results shown in (2) in FIG due to the strong electric field. That is, when f is too low, the pattern is partially replicated due to the insufficient intensity of the electric field. Each inset image in b in FIG. 9 represents the result of a computer simulation. It can be seen that this image supports the experimental result of the present Example 6. b in FIG. 9 is a diagram describing the experimental results of the present Example 4. From this, it can be seen that in the method according to the present disclosure using the high voltage, unlike the conventional method, a high reciprocal value of the time constant (fast growth rate) is maintained even at a distance in the micrometer range (the distance between the top electrode and the liquid thin film), i.e., even at low f, and that the corresponding electrostatic pressure is maintained at a high level.

Although embodiments of the present disclosure have been described in greater detail with reference to the accompanying drawings, the present disclosure is not necessarily limited to those embodiments. The present disclosure may be implemented in various modified ways without departing from the technical idea of the present disclosure. Accordingly, the embodiments disclosed in the present disclosure are not intended to limit the technical idea of the present disclosure, but rather to describe the present disclosure. The scope of the technical idea of the present disclosure is not limited by the embodiments. It should therefore be understood that the embodiments described above are in all respects illustrative and not limiting. The scope of protection of the present disclosure should be interpreted through the claims, and any technical ideas within the scope of the present disclosure should be interpreted to include within the scope of the present disclosure.

The invention claimed is:

1. A method for forming a fine pattern, the method comprising:

positioning an upper electrode having a master pattern formed on a bottom surface thereof, over a lower electrode having a fluid thin-film formed on a top surface thereof, such that the upper and lower electrodes are spaced apart from each other by a first spacing; and applying a high-voltage between the upper electrode and the lower electrode, thereby generating an electric field therebetween, wherein the high-voltage comprises a pulsed direct current (DC) voltage above 0.4 kV, and the first spacing is 1 μm or larger.

2. The method of claim 1, wherein a pulse of the pulsed direct-current (DC) high-voltage is 100 Hz or lower.

3. The method of claim 1, wherein the pulsed direct-current (DC) high-voltage is in a range of 1.0 to 2.5 kV.

4. The method of claim 3, wherein current flowing between the upper electrode and the lower electrode is in a range of 1 to 10 μA.

5. The method of claim 3, wherein the first spacing is in a range of 1 to 10 μm.

6. The method of claim 1, wherein when the first spacing is 1 μm or larger, a reciprocal of a characteristic time is maintained at 10 $s^{-1}$ or larger due to the application of the high-voltage.

* * * * *